United States Patent
Deter et al.

(10) Patent No.: US 11,206,264 B2
(45) Date of Patent: Dec. 21, 2021

(54) MINIMIZING TRAFFIC LEAKS DURING REPLACEMENT OF AN ACCESS CONTROL LIST FOR A NETWORK INTERFACE

(71) Applicant: Hewlett Packard Enterprise Development LP, Houston, TX (US)

(72) Inventors: Matthew Lee Deter, Roseville, CA (US); Christian E. Cleveland, Roseville, CA (US); Lisa Pinio, Roseville, CA (US); Kevin M. Worth, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 306 days.

(21) Appl. No.: 16/206,248

(22) Filed: Nov. 30, 2018

(65) Prior Publication Data

US 2020/0177594 A1     Jun. 4, 2020

(51) Int. Cl.
*H04L 29/06* (2006.01)
*H04L 12/911* (2013.01)

(52) U.S. Cl.
CPC ............ *H04L 63/101* (2013.01); *H04L 47/70* (2013.01)

(58) Field of Classification Search
CPC ...... H04L 63/103; H04L 47/70; G06F 21/602
USPC .......................................................... 726/4
See application file for complete search history.

(56) References Cited

U.S. PATENT DOCUMENTS

| | | | | |
|---|---|---|---|---|
| 9,444,744 | B1* | 9/2016 | Sharma | H04L 63/101 |
| 2014/0379915 | A1* | 12/2014 | Yang | H04L 63/101 |
| | | | | 709/225 |
| 2015/0067086 | A1* | 3/2015 | Adriaens | G06F 15/17331 |
| | | | | 709/212 |
| 2017/0346790 | A1* | 11/2017 | Duda | H04L 63/0263 |
| 2018/0375762 | A1* | 12/2018 | Bansal | H04L 61/251 |

OTHER PUBLICATIONS

FirewallPK: Security tool for centralized Access Control List management, Trandafir et al, Sep. 2014 (Year: 2014).*

* cited by examiner

*Primary Examiner* — Jahangir Kabir
(74) *Attorney, Agent, or Firm* — Sheppard Mullin Richter & Hampton LLP

(57) ABSTRACT

Systems and methods are provided for minimizing traffic leaks during replacement of an access control list for a network interface. The method includes adding a blocking access control entry to an access control list for a network interface of a network switch, wherein the blocking entry causes the network interface to block traffic from passing through the network interface; removing one or more current access control entries from the access control list, except for the blocking entry, after adding the blocking entry to the access control list; adding one or more new access control entries to the access control list, without removing the blocking entry, after removing the one or more current access control entries from the access control list; and removing the blocking entry from the access control list after adding the one or more new access control entries to the access control list.

15 Claims, 6 Drawing Sheets

ACL 222

| Sequence No. | Access Control Entry (ACE) |
|---|---|
| 1 | (empty) |
| 2 | current first entry |
| 3 | current second entry |
| 4 | current third entry |
| ⋮ | ⋮ |

FIG. 4

ACL 222

| Sequence No. | Access Control Entry (ACE) |
|---|---|
| 1 | deny all |
| 2 | current first entry |
| 3 | current second entry |
| 4 | current third entry |
| ⋮ | ⋮ |

FIG. 5

ACL 222

| Sequence No. | Access Control Entry (ACE) |
|---|---|
| 1 | deny all |
| 2 | (empty) |
| 3 | (empty) |
| 4 | (empty) |
| ⋮ | ⋮ |

FIG. 6

ACL 222

| Sequence No. | Access Control Entry (ACE) |
|---|---|
| 1 | deny all |
| 2 | new first entry |
| 3 | new second entry |
| 4 | new third entry |
| ⋮ | ⋮ |

*FIG. 7*

ACL 222

| Sequence No. | Access Control Entry (ACE) |
|---|---|
| 1 | (empty) |
| 2 | new first entry |
| 3 | new second entry |
| 4 | new third entry |
| ⋮ | ⋮ |

*FIG. 8*

MINIMIZING TRAFFIC LEAKS DURING REPLACEMENT OF AN ACCESS CONTROL LIST FOR A NETWORK INTERFACE

DESCRIPTION OF RELATED ART

Traffic in networks such as the Internet is passed between endpoints through one or more network switches. Each network switch may operate according to one or more access control lists (ACLS). Each ACL permits or denies traffic flowing through the switch based on various network criteria defined by a network administrator.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIGS. 4-7 depict the replacement of an example access control list according to one embodiment.

FIG. 4 depicts the access control lists before replacement begins.

FIG. 5 shows the access control list after the addition of the blocking access control entry.

FIG. 6 shows the access control list after removal of all the current access control entries, except for the blocking access control entry.

FIG. 7 shows the access control list after adding the one or more new access control entries to the access control list.

FIG. 8 shows the access control list after removing the blocking access control entry from the access control list.

The figures are not exhaustive and do not limit the present disclosure to the precise form disclosed.

DETAILED DESCRIPTION

An access control list (ACL) on a network switch allows or blocks traffic entering the switch based on various criteria defined by a network administrator. Each ACL controls traffic of one traffic type entering a network switch on one interface. The traffic type is defined by address protocol, that is, Ethernet, IPv4, or IPv6. Each interface may include one or more ports, one or more virtual local area networks (VLANS), or the like.

Due to hardware limitations, ACL entries cannot be modified in-place, and so must be replaced. Therefore to change an ACL, the ACL is typically replaced with a new ACL. Two methods are currently used to replace an ACL. In the first approach, the current ACL is removed before installing the new ACL. But under this approach, there are periods where the current ACL is partially removed and where the new ACL is partially installed. During these periods, traffic that should be blocked may leak into the switch.

In the second approach, a new list is installed before removing the current list, but with a lower priority than the current ACL. This approach minimizes traffic leaks, but has two significant drawbacks. The first is that it requires twice the amount of ternary content-addressable memory (TCAM), a very expensive type of memory that is commonly used to implement ACLs in network switches. Therefore, this approach can only be used for small ACLs that occupy half the TCAM or less. The second drawback is that after installation of the new ACL, and during removal of the current ACL, traffic processing will be unpredictably affected by the partially removed current ACL.

Embodiments may be implemented using a modified version of the first approach. For example, before removing the current ACL, a new entry is added to the ACL, with the highest priority, that blocks traffic from entering the interface. The current ACL may then be removed, and the new ACL is then installed. The blocking entry may then be removed so that traffic may be admitted to the interface.

Figure 1:
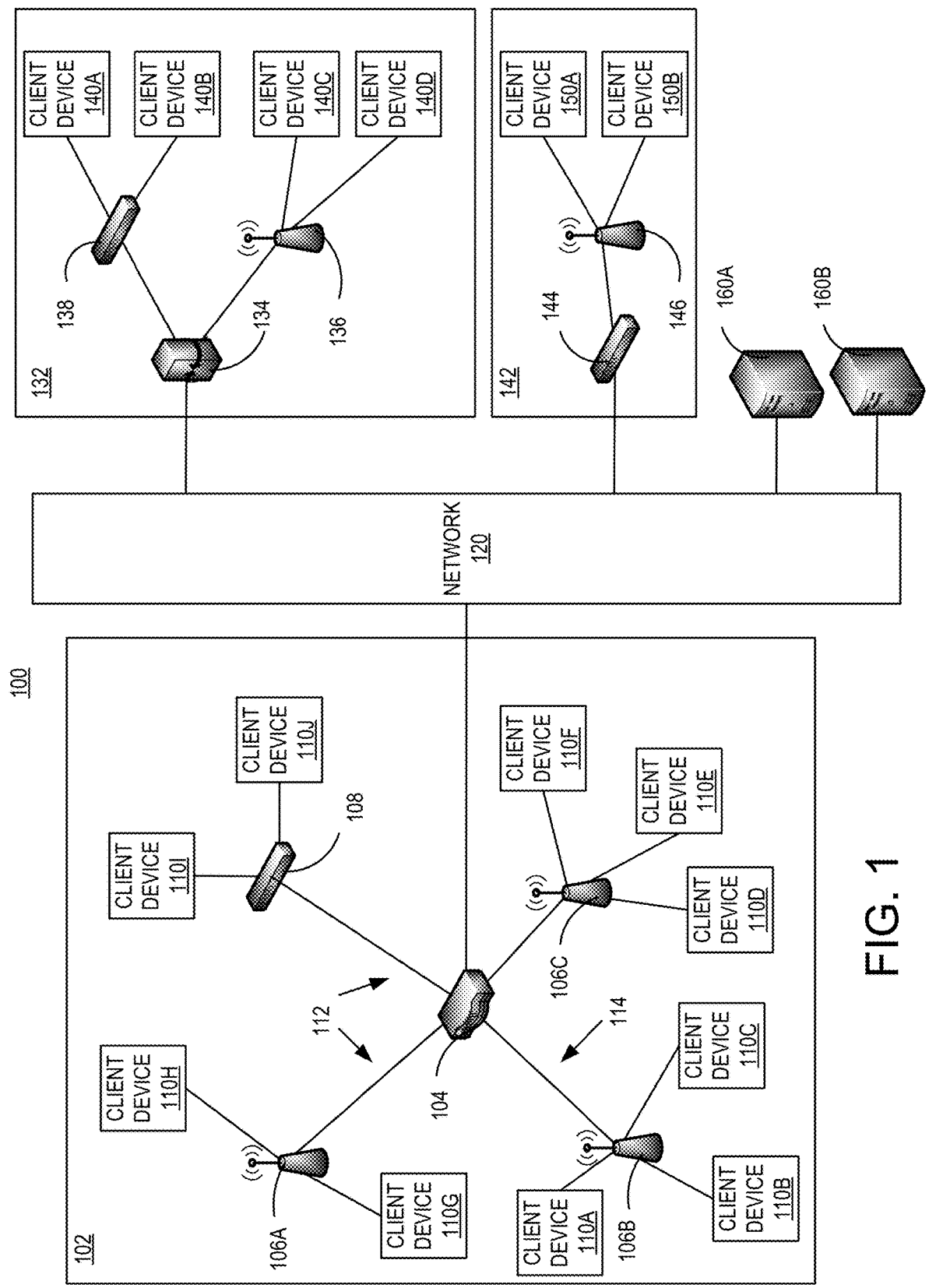
FIG. 1 illustrates one example of a network configuration that may be implemented for an organization, such as a business, educational institution, governmental entity, healthcare facility or other organization.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (Aps) 106*a-c*. Switches 108 and wireless APs 106*a-c* provide network connectivity to various client devices 110*a-j*. Using a connection to a switch 108 or AP 106*a-c*, a client device 110*a-j* may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110*i-j*. Client devices 110*i-j* may connect to the switch 108 and through the switch 108, may be able to access other devices within the network configuration 100. The client devices 110*i-j* may also be able to access the network 120, through the switch 108. The client devices 110*i-j* may communicate with the switch 108 over a wired 112 connection. In the illustrated example, the switch 108 communicates with the controller 104 over a wired 112 connection, though this connection may also be wireless.

Wireless APs 106*a-c* are included as another example of a point of access to the network established in primary site 102 for client devices 110*a-h*. Each of APs 106*a-c* may be a combination of hardware, software, and/or firmware that is configured to provide wireless network connectivity to wireless client devices 110*a-h*. In the illustrated example, APs 106*a-c* can be managed and configured by the controller 104. APs 106*a-c* communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140*a-d*.

In various embodiments, the remote site 132 may be in direct communication with primary site 102, such that client devices 140*a-d* at the remote site 132 access the network resources at the primary site 102 as if these clients devices 140*a-d* were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150*a-b* access the network 120. Such a remote site 142 may represent, for example, an individual employee's home or a temporary remote office. The remote site 142 may also be in communication with the primary site 102, such that the client devices 150*a-b* at remote site 142 access network resources at the primary site 102 as if these client devices 150*a-b* were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160*a-b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160*a-b*. Content servers 160*a-b* may include various providers of multimedia downloadable and/or streaming content, including audio, video, graphical, and/or text content, or any combination thereof. Examples of content servers 160*a-b* include, for example, web servers, streaming radio and video providers, and cable and satellite television providers. The client devices 110*a j*, 140*a-d*, 150*a-b* may request and access the multimedia content provided by the content servers 160*a-b*.

Figure 2:
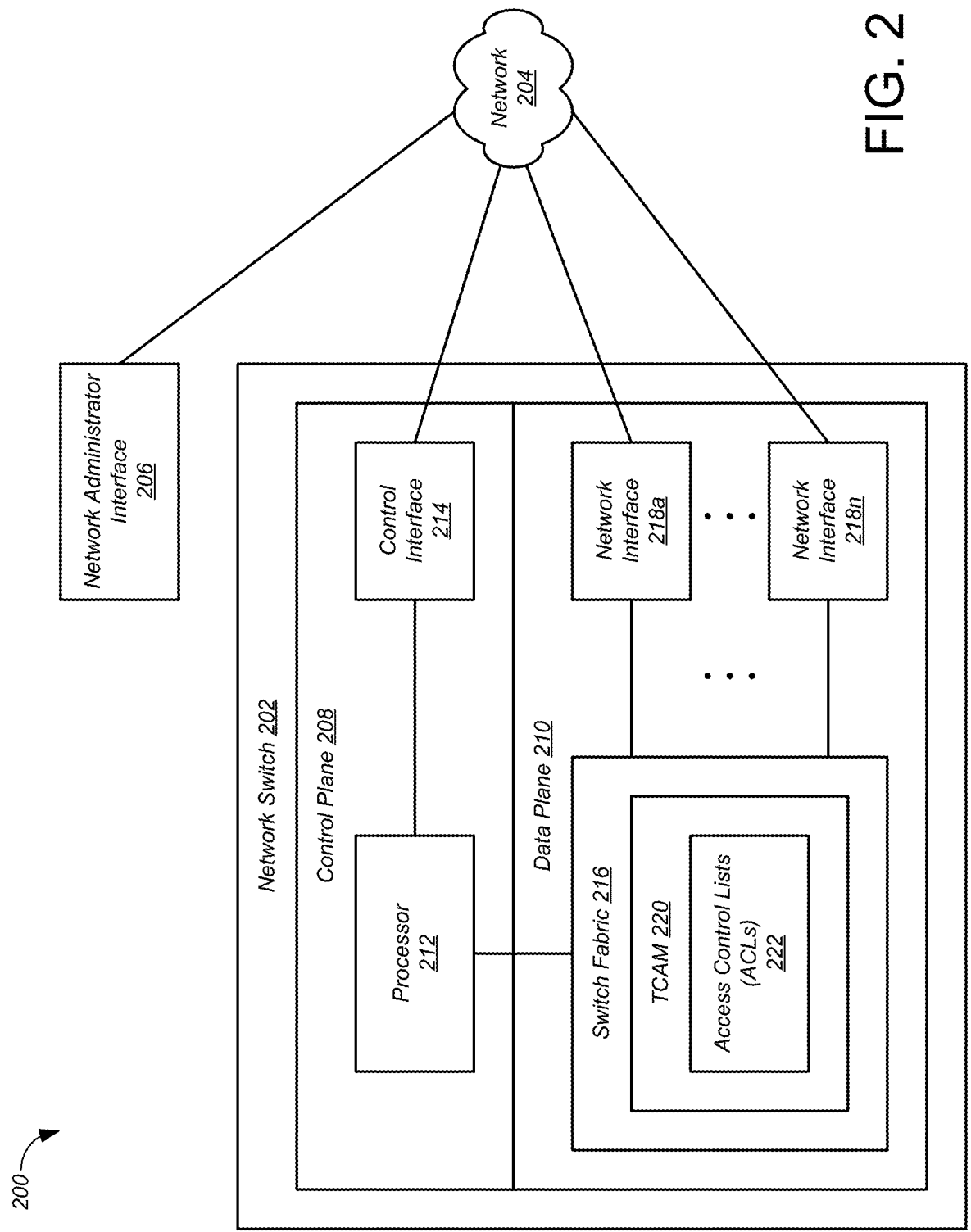
FIG. 2 is a block diagram of a system in which embodiments described herein may be implemented.

Now embodiments of the disclosed systems and methods will be described in detail. FIG. 2 is a block diagram of a system 200 in which embodiments described herein may be implemented. Referring to FIG. 2, system 200 includes a network switch 202 connected to a network 204, and a network administrator interface 206, also connected to the network 204. The network administrator interface 206 may be used by a network administrator to control the network switch 202. For example, a network administrator may use the network administrator interface 206 to replace access control lists, as described in detail below.

Network switch 202 may include a control plane 208 and a data plane 210. The control plane 208 may include a processor 212 and a control interface 214. The control interface 214 may be connected to the network 204. The data plane 210 includes a switch fabric 216 and a plurality of network interfaces 218*a-n*. The network interfaces 218*a-n* may be connected to the network 204. The switch fabric 216 may include a ternary content-addressable memory (TCAM)

220. A plurality of access control lists (ACL) 222 may be implemented within TCAM 220, and may be programmed by the processor 212.

The network interfaces 218a-n of the switch 202 operate according to the access control lists 222. An access control list 222 allows a network administrator to define sets of rules based on network traffic addressing or other header content, and to use these rules to restrict, alter or log the passage of traffic through the network switch 202. An access control list 222 may be configured to match almost any frame or packet header field, and then take a corresponding action. For example, network traffic passing through the network switch 202 may be blocked, permitted, counted, or reprioritized based on frame/packet characteristics.

An access control list 222 may be applied to a network interface 218 to control traffic arriving on that network interface 218, leaving on that network interface 218, or both. A given network interface 218 may support a single access control list 222 per traffic type, and/or per direction for up to four interface-applied access control lists 222. That is, a single network interface 218 may support one or more of the following access control applications: Ethernet inbound, IPv4 inbound, IPv4 outbound, and IPv6 inbound.

An access control list 222 contains one or more access control entries (ACE), which are listed according to priority by sequence number. A single access control entry matches on one or more characteristics of a packet/frame of the particular traffic type, and has a configured action to either discard or allow the packet/frame to continue through the switch 202. This occurs by, beginning with the access control entry with the lowest sequence number, comparing the incoming or outgoing packet/frame to its particular match characteristics, and if there is a match, taking the action for that access control entry to either permit or deny that packet/frame. If there is no match, the match characteristics of the next access control entry in the sequence are compared to the relevant frame/packet details, and if there is a match the specified action is taken. This process continues until a match is found, or the end of the access control list 222 is reached.

Figure 3:
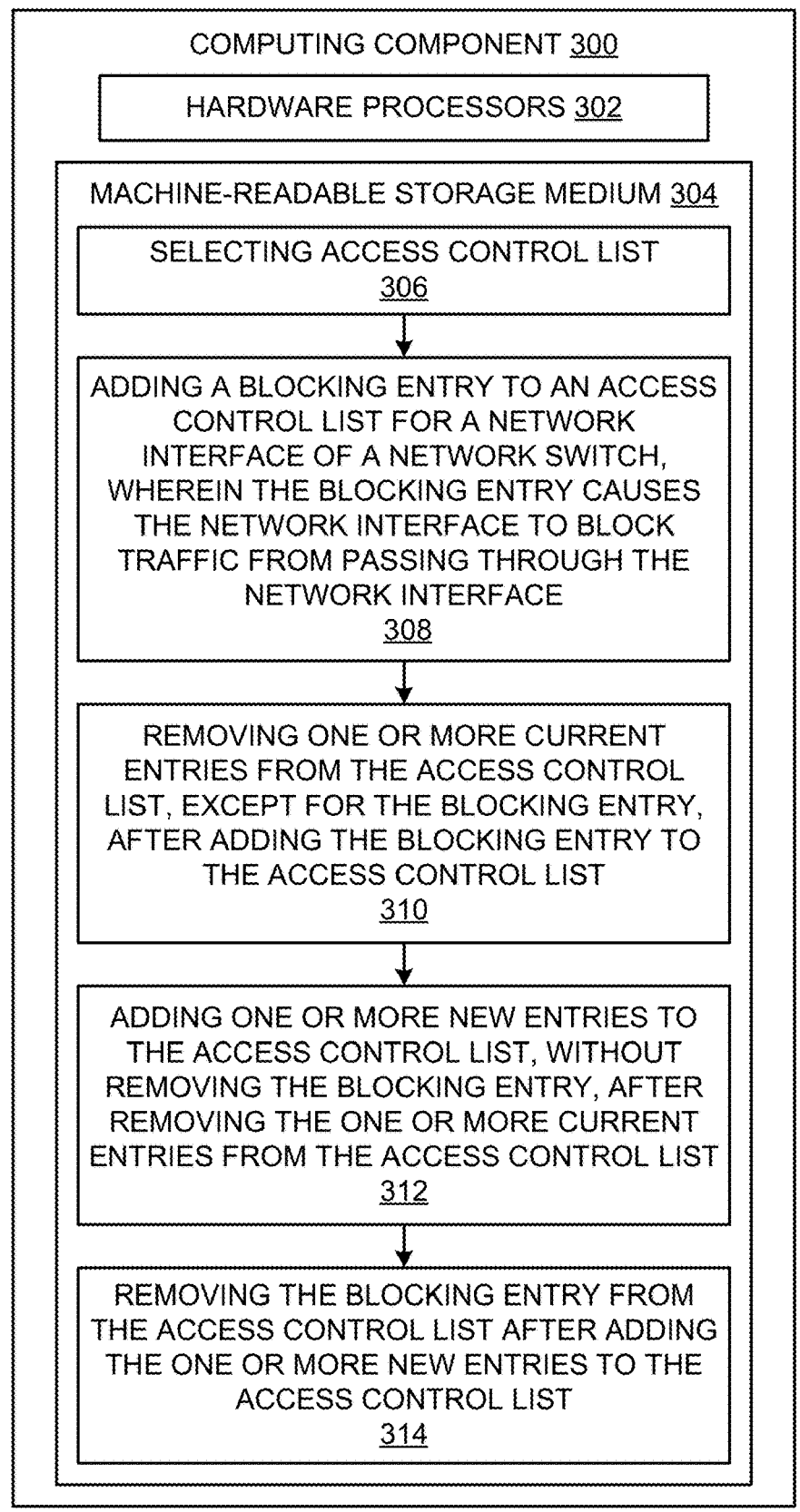
FIG. 3 is a block diagram of an example computing component or device for minimizing traffic leaks during replacement of an access control list to a network interface in accordance with one embodiment.

FIG. 3 is a block diagram of an example computing component or device 300 for minimizing traffic leaks during replacement of an access control list 222 to a network interface 218 in accordance with one embodiment. Computing component 300 may be, for example, a server computer, a controller, or any other similar computing component capable of processing data. In the example implementation of FIG. 3, the computing component 300 includes a hardware processor, 302, and machine-readable storage medium 304.

In some embodiments, computing component 300 may be an embodiment of the network administrator interface 206, the processor 212 of the network switch 202, or any combination thereof.

Hardware processor 302 may be one or more central processing units (CPUs), semiconductor-based microprocessors, and/or other hardware devices suitable for retrieval and execution of instructions stored in machine-readable storage medium 304. Hardware processor 302 may fetch, decode, and execute instructions, such as instructions 306-314, to control processes or operations for minimizing traffic leaks during replacement of an access control list 222 to a network interface 218. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 304 may be encoded with executable instructions, for example, instructions 306-314.

Hardware processor 302 may execute instruction 306 to perform selecting one of the access control lists 222. Each access control list 222 controls one network interface 218 for one type of traffic. Each network interface 218 may include one or more ports, or one or more virtual local area networks (VLANs). The traffic types may include Ethernet, Internet protocol version 4 (IPv4), and Internet protocol version 6 (IPv6). Therefore selecting one of the access control lists 222 may include selecting a traffic type, selecting a network interface 218 of the network switch 202, or both. In this example, network interface 218a is selected. However, it will be understood that any of network interfaces 218a-n may be selected.

FIGS. 4-7 depict the replacement of an example access control list 222 according to one embodiment. The access control list 222 includes a plurality of access control entries (ACE). Each access control entry has a sequence number. The access control entries are arranged in order of priority, with the lowest sequence number having the highest priority. According to embodiments of the invention, the highest-priority access control entry in each access control lists 222 is kept empty except when replacing the access control list 222.

FIG. 4 depicts the access control list 222 before replacement begins. The highest-priority access control entry, shown in FIG. 4 as having sequence number 1, is empty. The remaining access control entries are referred to as "current." In FIG. 4, these current entries are labeled "current first entry," "current second entry," and "current third entry." In FIGS. 4-7, only four access control entries are shown. However, it will be understood that the access control list 222 may include fewer entries, or more entries. At this point, the network interface 218a operates according to the current access control entries in the access control list 222, in priority order.

Hardware processor 302 may execute instruction 308 to perform adding a blocking access control entry to the access control list 222 for the network interface 218a of the network switch 202. The blocking access control entry may be added as the highest-priority access control entry in the access control list 222. FIG. 5 shows the access control list 222 after the addition of the blocking access control entry. In particular, FIG. 5 shows the blocking access control entry "deny all" for sequence number 1. The blocking access control entry "deny all" causes the network interface 218a to block traffic of the access control list's protocol type from passing through the corresponding network interface 218a.

Hardware processor 302 may execute instruction 310 to perform removing one or more current access control entries from the access control list 222, except for the blocking access control entry, after adding the blocking access control entry to the access control list. In one example embodiment, all current access control entries are removed from the access control list 222, except for the blocking access control entry, after adding the blocking entry to the access control list 222. FIG. 6 shows the access control list 222 after removal of all the current access control entries, except for the blocking access control entry. In particular, FIG. 6 shows the blocking access control entry "deny all" for sequence number 1, while showing the remaining access control entries to be empty. At this point, the blocking access control entry "deny all" continues to cause the network interface 218a to block traffic from passing through the corresponding network interface 218a.

Hardware processor 302 may execute instruction 312 to perform adding one or more new access control entries to the access control list 222, without removing the blocking access control entry, after removing the one or more current access control entries from the access control list 222. FIG. 7 shows the access control list 222 after adding the one or more new access control entries to the access control list 222. In particular, FIG. 7 shows the blocking access control entry "deny all" for sequence number 1, while showing the remaining access control entries to be new. In FIG. 7, these new entries are labeled "new first entry," "new second entry," and "new third entry." In FIG. 7, only four access control entries are shown. However, it will be understood that the access control list 222 may include fewer entries, or more entries. At this point, the blocking access control entry "deny all" continues to cause the network interface 218a to block traffic from passing through the corresponding network interface 218a.

Hardware processor 302 may execute instruction 314 to perform removing the blocking access control entry from the access control list 222 after adding the one or more new access control entries to the access control list 222. FIG. 8 shows the access control list 222 after removing the blocking access control entry from the access control list 222. In particular, the highest-priority access control entry, shown in FIG. 8 as having sequence number 1, is empty, while showing the remaining access control entries to be new. At this point, the corresponding network interface 218a operates according to the remaining access control entries in the access control list 222, in priority order.

Figure 9:
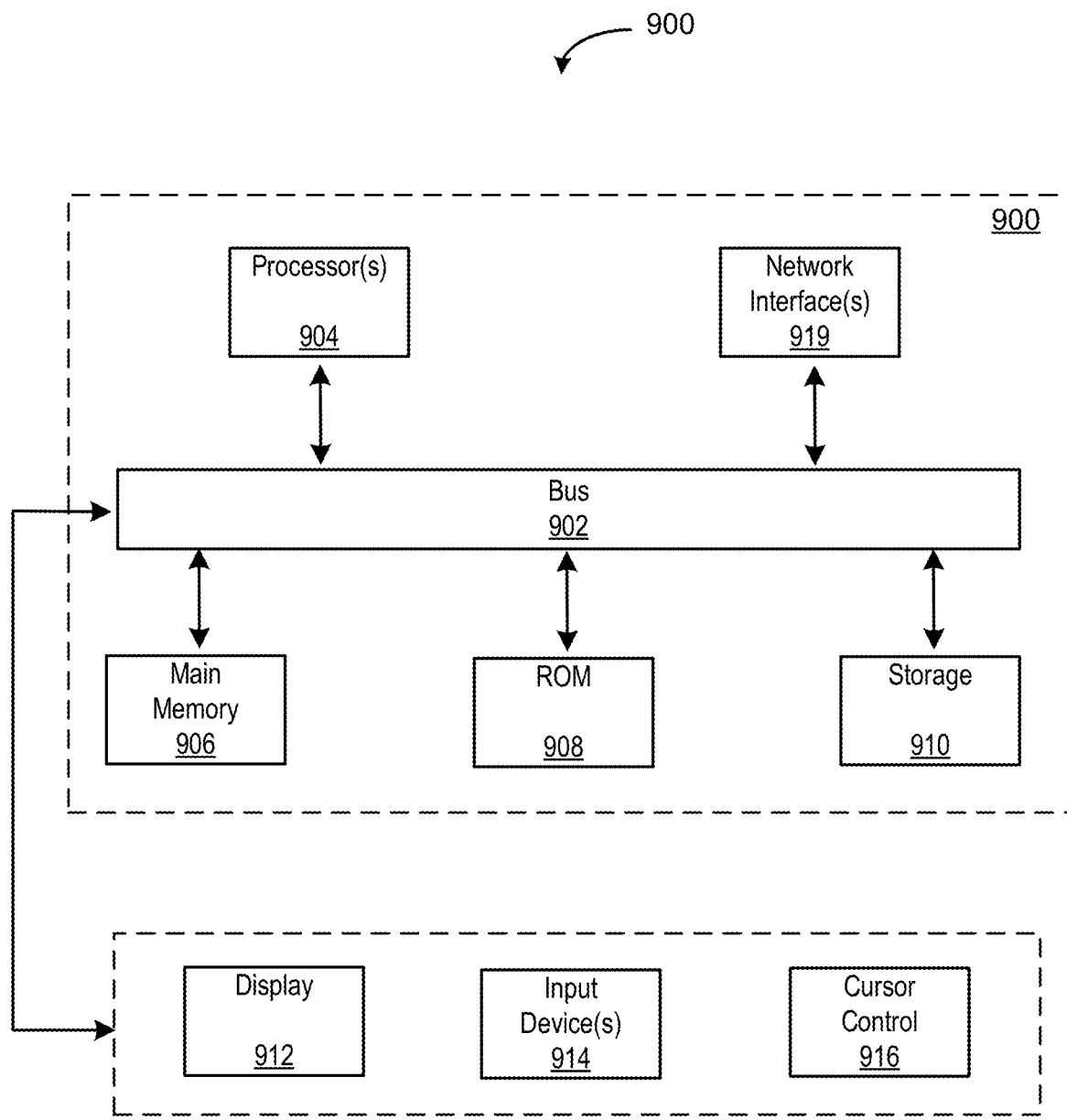
FIG. 9 depicts a block diagram of an example computer system in which various of the embodiments described herein may be implemented.

FIG. 9 depicts a block diagram of an example computer system 900 in which various of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hardwired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a communication interface 918 coupled to bus 902. Network interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, network interface 918 may be a local area network (LAN) card to provide a data communication connection to a compatible LAN (or WAN component to communicated with a WAN). Wireless links may also be implemented. In any such implementation, network interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
   selecting, from a plurality of traffic types supported by a network interface of a network switch, a traffic type, wherein the plurality of traffic types comprise at least Ethernet traffic, Internet protocol version 4 (IPv4) traffic, and Internet protocol version 6 (IPv6) traffic;
   inserting a single blocking access control entry into an access control list associated with the selected traffic type as a highest-priority access control entry, wherein the single blocking access control entry causes the network interface to block traffic from passing through the network interface;
   removing one or more current access control entries from the access control list, except for the single blocking access control entry, after inserting the single blocking access control entry into the access control list;
   adding one or more new access control entries to the access control list, without removing the single blocking access control entry, after removing the one or more current access control entries from the access control list; and
   removing the single blocking access control entry from the access control list after adding the one or more new access control entries to the access control list.

2. The method of claim 1, further comprising:
   selecting the access control list.

3. The method of claim 2, further comprising:
   selecting the network interface of the network switch; and
   selecting the access control list according to the selected network interface.

4. The method of claim 3, wherein the selected network interface of the network switch comprises at least one of:
   one or more ports; and
   one or more virtual local area networks (VLANs).

5. The method of claim 1, wherein the highest-priority access control entry in the access control list is empty prior to the insertion of the single blocking access control entry.

6. A system, comprising:
   a hardware processor; and
   a non-transitory machine-readable storage medium encoded with instructions executable by the hardware processor to perform a method comprising:
     selecting, from a plurality of traffic types supported by a network interface of a network switch, a traffic type, wherein the plurality of traffic types comprise at least Ethernet traffic, Internet protocol version 4 (IPv4) traffic, and Internet protocol version 6 (IPv6) traffic;
     inserting a single blocking access control entry into an access control list associated with the selected traffic type as a highest-priority access control entry, wherein the single blocking access control entry causes the network interface to block traffic from passing through the network interface;
     removing one or more current access control entries from the access control list, except for the single blocking access control access control entry, after inserting the single blocking access control access control entry into the access control list;
     adding one or more new access control entries to the access control list, without removing the single blocking access control access control entry, after removing the one or more current access control entries from the access control list; and
     removing the single blocking access control access control entry from the access control list after adding the one or more new access control entries to the access control list.

7. The system of claim 6, the method further comprising:
   selecting the access control list.

8. The system of claim 7, the method further comprising:
   selecting the network interface of the network switch; and
   selecting the access control list according to the selected network interface.

9. The system of claim 8, wherein the selected network interface of the network switch comprises at least one of:
   one or more ports; and
   one or more virtual local area networks (VLANs).

10. The system of claim 6, wherein the highest-priority access control entry in the access control list is empty prior to the insertion of the single blocking access control entry.

11. A non-transitory machine-readable storage medium encoded with instructions executable by a hardware processor of a computing component, the machine-readable storage medium comprising instructions to cause the hardware processor to perform a method comprising:
    selecting, from a plurality of traffic types supported by a network interface of a network switch, a traffic type, wherein the plurality of traffic types comprise at least Ethernet traffic, Internet protocol version 4 (IPv4) traffic, and Internet protocol version 6 (IPv6) traffic;
    inserting a single blocking access control entry into an access control list associated with the selected traffic type as a highest-priority access control entry, wherein the single blocking access control entry causes the network interface to block traffic from passing through the network interface;
    removing one or more current access control access control entries from the access control list, except for the single blocking access control entry, after inserting the single blocking access control entry to the access control list;
    adding one or more new access control access control entries to the access control list, without removing the single blocking access control entry, after removing the one or more current access control entries from the access control list; and
    removing the single blocking access control entry from the access control list after adding the one or more new access control entries to the access control list.

12. The non-transitory machine-readable storage medium of claim 11, the method further comprising:
    selecting the access control list.

13. The non-transitory machine-readable storage medium of claim 12, the method further comprising:
    selecting the network interface of the network switch; and
    selecting the access control list according to the selected network interface.

14. The non-transitory machine-readable storage medium of claim 13, wherein the selected network interface of the network switch comprises at least one of:
    one or more ports; and
    one or more virtual local area networks (VLANs).

15. The non-transitory machine-readable storage medium of claim 11, wherein the highest-priority access control entry in the access control list is empty prior to the insertion of the single blocking access control entry.

* * * * *